(12) United States Patent
Grieser et al.

(10) Patent No.: US 6,179,515 B1
(45) Date of Patent: Jan. 30, 2001

(54) BRACKET ASSEMBLY FOR MAINTAINING A MITER JOINT

(75) Inventors: Jerry D. Grieser, Archbold; Richard A. Nelson, Napoleon; Thomas B. Warner, Archbold, all of OH (US)

(73) Assignee: Sauder Woodworking Co., Archbold, OH (US)

(*) Notice: Under 35 U.S.C. 154(b), the term of this patent shall be extended for 0 days.

(21) Appl. No.: 09/217,240

(22) Filed: Dec. 21, 1998

Related U.S. Application Data

(60) Provisional application No. 60/086,218, filed on May 21, 1998.

(51) Int. Cl.$^7$ ..................................................... A47G 1/10
(52) U.S. Cl. ........................ 403/402; 403/381; 403/403; 52/288.1
(58) Field of Search ................................... 403/402, 401, 403/403, 363, 381, 382, DIG. 13; 52/287.1, 288.1, 261, 271, 582.1; 312/263, 265.5, 111, 108

(56) References Cited

U.S. PATENT DOCUMENTS

| 2,230,688 | * | 7/1941 | Irwin | 52/288.1 X |
| 2,274,317 | * | 2/1942 | Bonnell | 52/288.1 |
| 2,653,360 | * | 9/1953 | Woodworth | 403/402 |
| 3,353,854 | * | 11/1967 | Hansen | 52/288.1 X |
| 4,161,977 | * | 7/1979 | Baslow | 403/402 X |
| 5,918,392 | * | 7/1999 | Bates | 403/402 X |

* cited by examiner

Primary Examiner—Lynne H. Browne
Assistant Examiner—John R. Cottingham
(74) Attorney, Agent, or Firm—Emch, Schaffer, Schaub & Porcello, Co., L.P.A.

(57) ABSTRACT

A bracket assembly for maintaining a miter joint between a first member and a second member including a bracket having a first surface and a second surface positioned at a predetermined angle with respect to the first surface. Attachment devices are positioned on the bracket for attaching the bracket to the first and second members to maintain the miter joint.

4 Claims, 7 Drawing Sheets

BRACKET ASSEMBLY FOR MAINTAINING A MITER JOINT

This application claims the benefit of U.S. Provisional Application No. 60/086,218 filed May 21, 1998.

BACKGROUND OF THE INVENTION

The present invention relates to an assembly for maintaining a miter joint. More specifically, the invention is directed to a bracket assembly for maintaining a miter joint between two furniture members.

SUMMARY OF THE INVENTION

The present invention is directed to a bracket assembly for maintaining a miter joint between a first member and a second member of a furniture article. The assembly includes a bracket that has a first surface and a second surface positioned at a predetermined angle with respect to said first surface. Attachment devices are positioned on each of the first and second surfaces of the bracket. The attachment devices are received by, for example, slots having configurations that correspond to the attachment devices. The attachment devices attach the bracket to the first and second members to maintain a miter joint between the first and second members.

The primary object of the present invention is to provide a bracket assembly for maintaining a miter joint.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
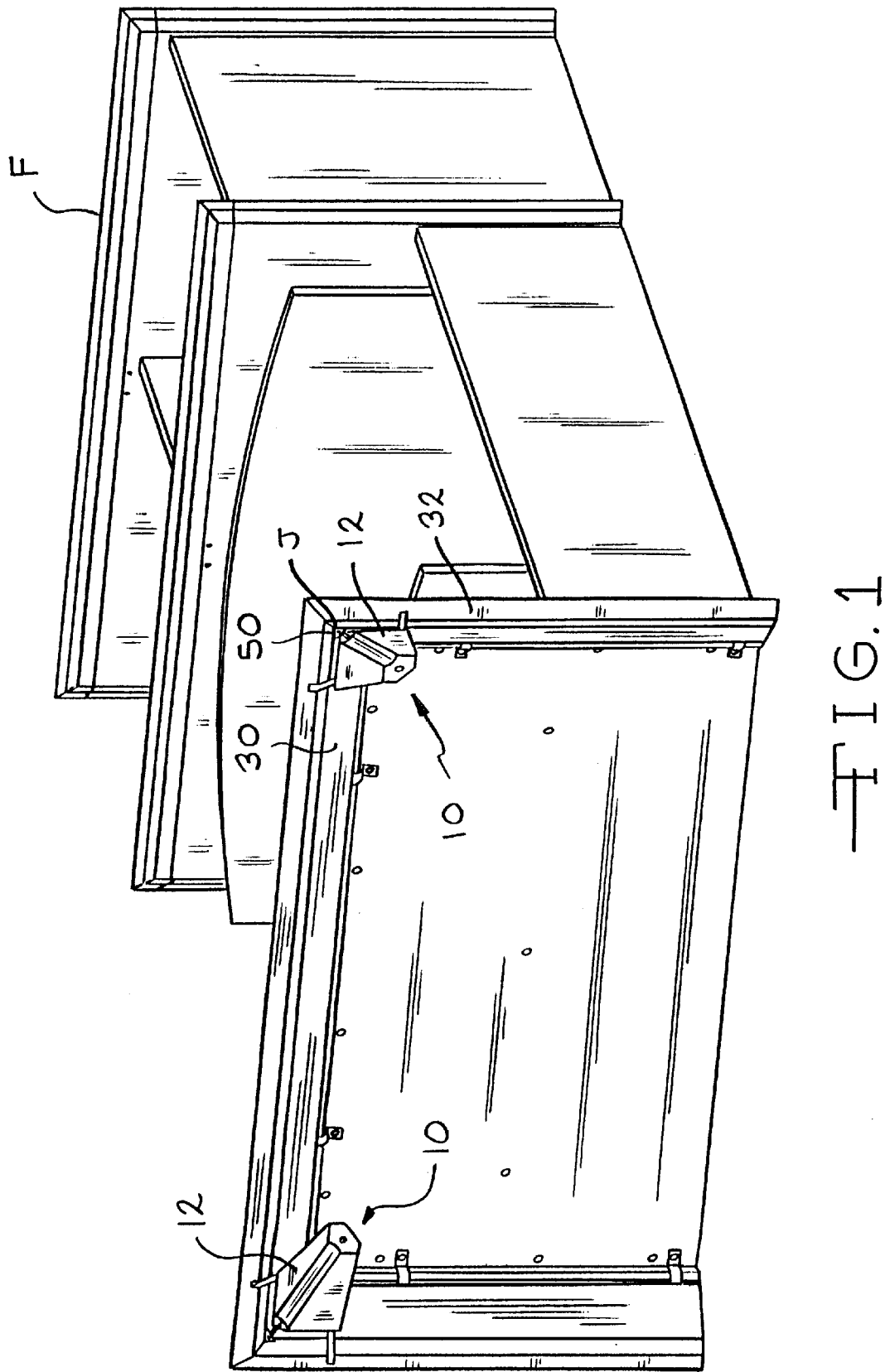
FIG. 1 is a perspective view of an article of furniture including a bracket assembly for maintaining a miter joint between a first member and a second member according to the present invention.

The preferred embodiments and best mode of the present invention will now be described in detail with reference being made to the drawings. The bracket assembly of the present invention is indicated generally in the drawings by the reference number "10".

Figure 2:
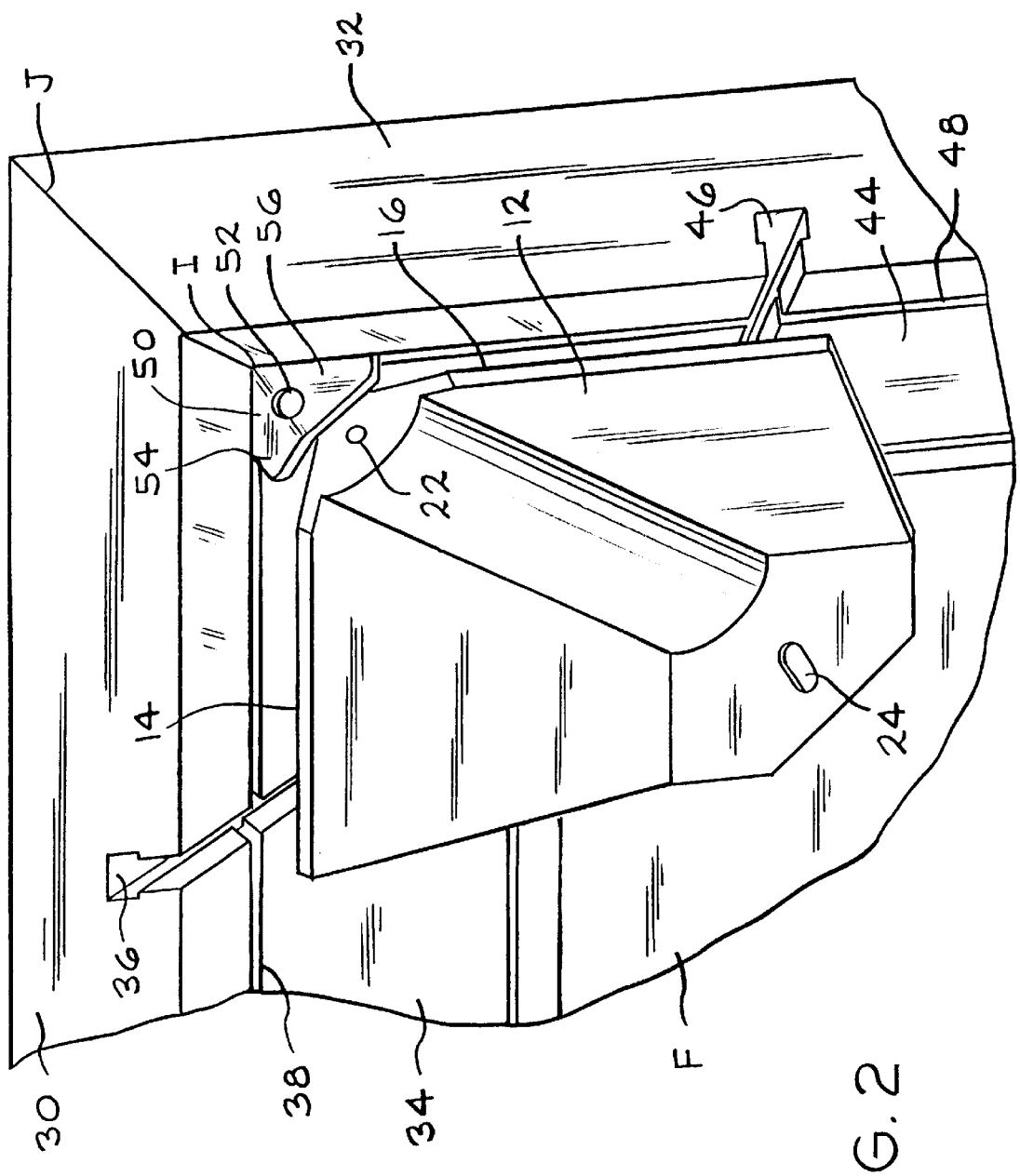
FIG. 2 is a detailed perspective view of a bracket and a clip of the present invention positioned adjacent to the first and second members.
Figure 3:
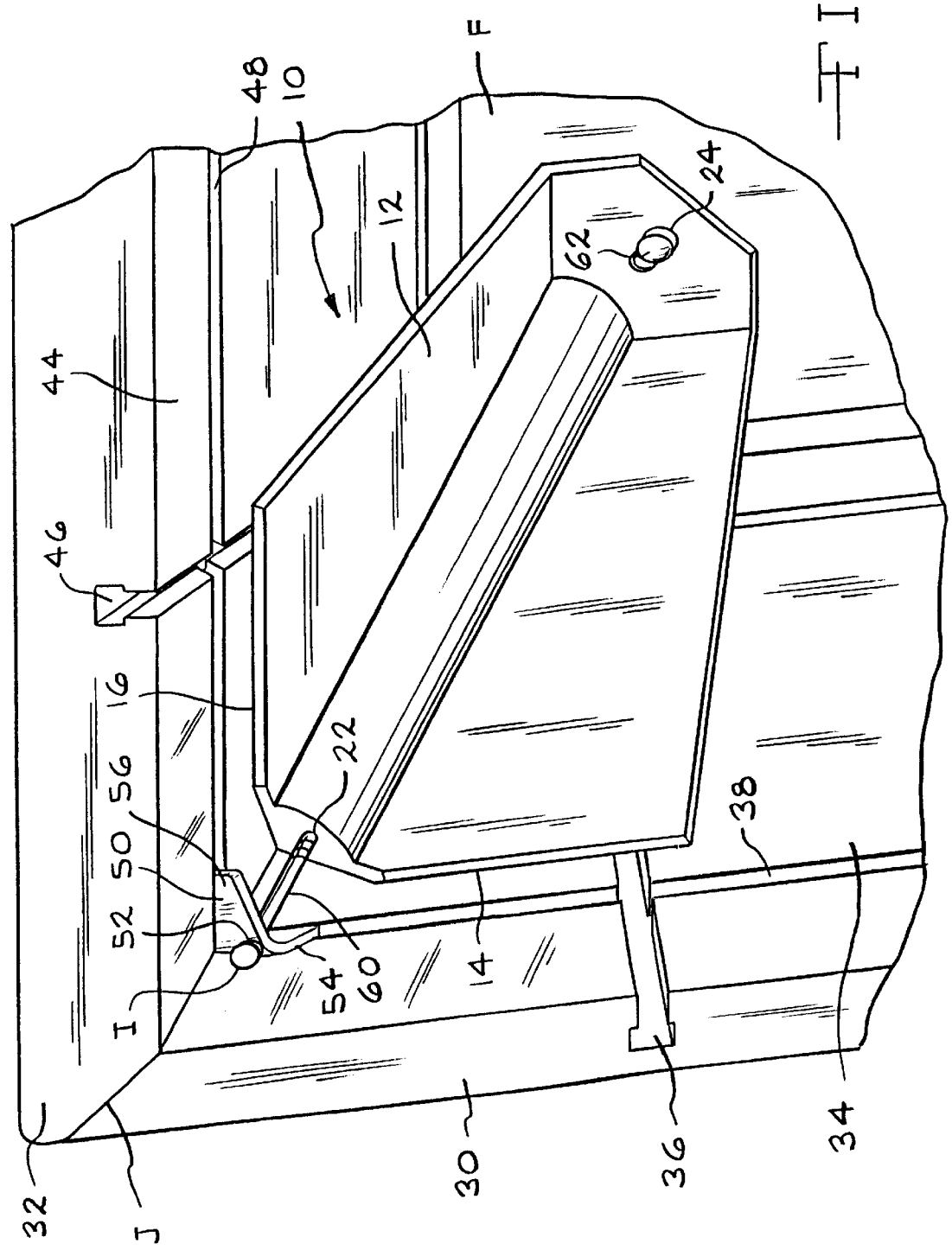
FIG. 3 is a detailed perspective view of a bracket assembly according to the present assembly positioned adjacent to the first and second members.
Figure 4:
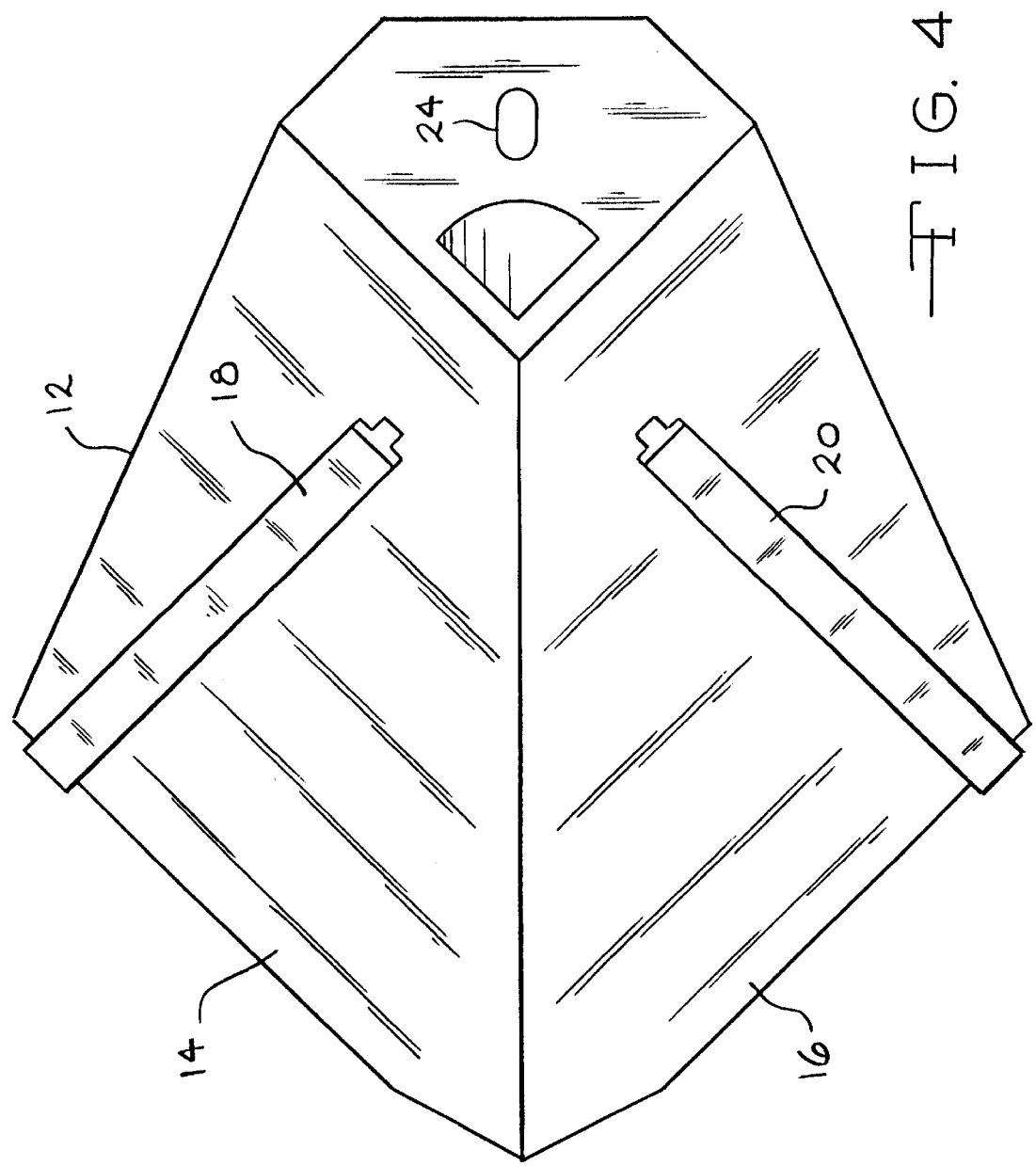
FIG. 4 is a plan view of the outside of the bracket according to the present invention.
Figure 5:
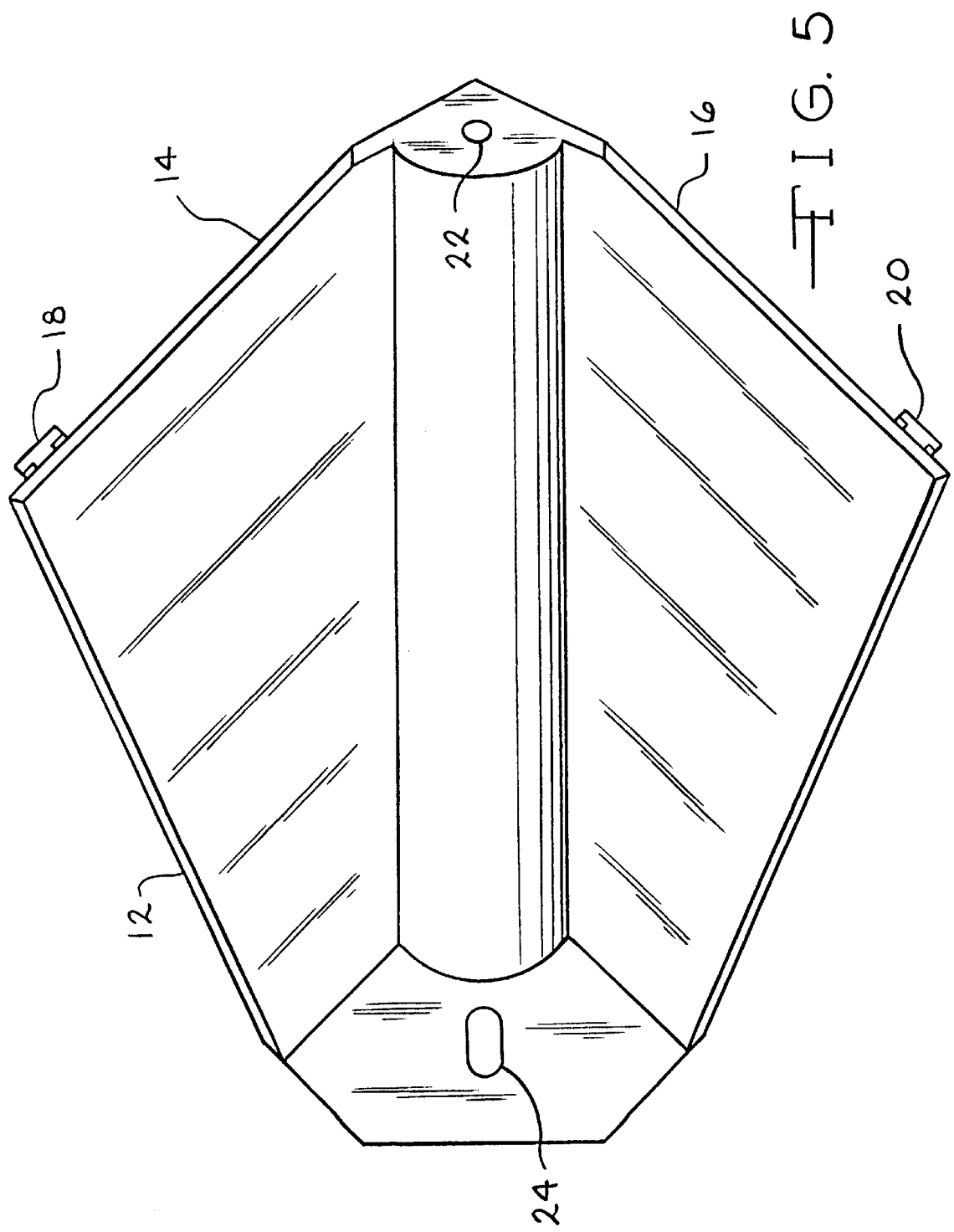
FIG. 5 is a plan view of the inside of the bracket.
Figure 6:
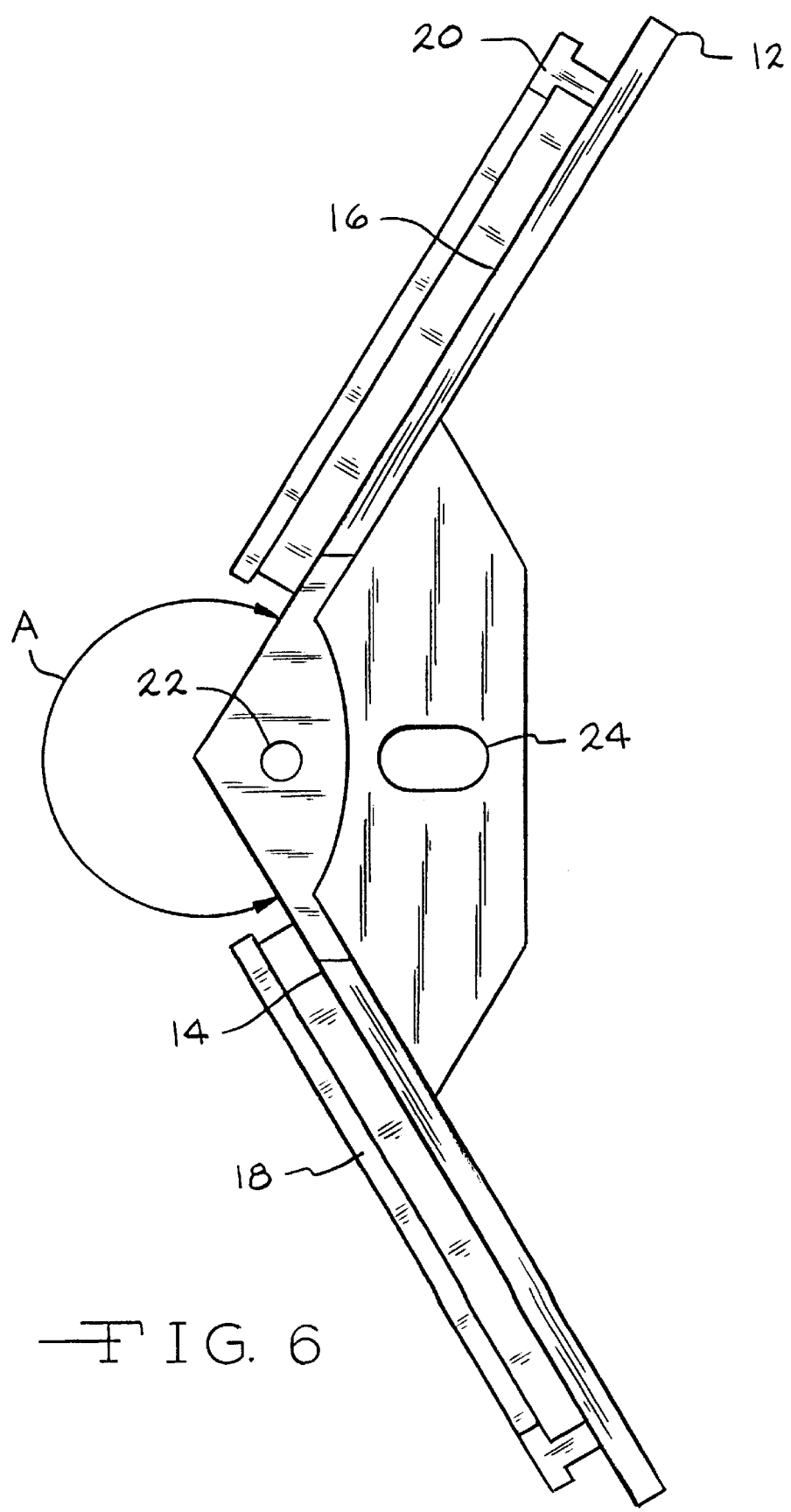
FIG. 6 is a side elevational view of the bracket of the present invention.
Figure 7:
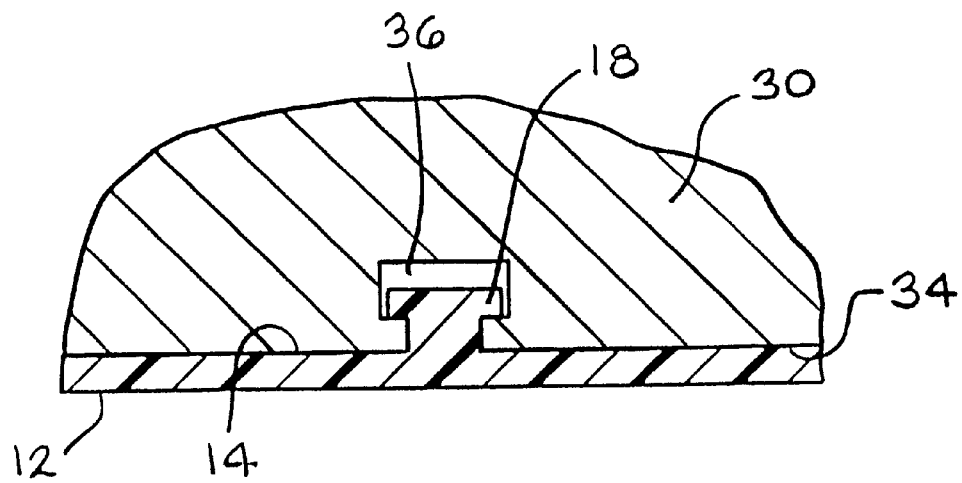
FIG. 7 is a detailed view of a first attachment device of the bracket positioned in a first slot of the first member.

Referring to FIGS. 1–6, the assembly 10 includes a bracket 12 having a first surface 14 and a second surface 16. The first and second surfaces 14 and 16 are positioned at a predetermined angle A (FIG. 6) with respect to one another. The predetermined angle A depends on the use of the assembly 10. In most cases, the predetermined angle will be in a range of from about 200° to about 280°, with 240° being preferred. As best shown in FIG. 4, the bracket 12 includes a first attachment device 18 longitudinally extending on the first surface 14. The bracket 12 further includes a second attachment device 20 longitudinally extending on the second surface 16. In a preferred embodiment, the first and second attachment devices 18 and 20 have T-shaped configurations. However, it should be understood that the first and second attachment devices 18 and 20 can have various geometric configurations depending on the application. As shown in FIG. 5, the bracket 12 defines a first opening 22 and a second opening 24. In a preferred embodiment, the bracket 12 is made of plastic such as nylon.

Referring to FIGS. 1–3, the bracket 1 2 is positioned at a miter joint J formed between a first member 30 and a second member 32 of a furniture article F. The first member 30 includes a first interior surface 34 having a first slot 36 that has a configuration which corresponds to the configuration of the first attachment device 18. In a preferred embodiment, the first slot 36 has a T-shaped configuration. The first interior surface 34 includes a first clip groove 38 that extends in a perpendicular relationship with respect to the first slot 36.

Still referring to FIGS. 1–3, the second member 32 includes a second interior surface 44 having a second slot 46 that has, for example, a T-shaped configuration corresponding to the second attachment device 20. The second interior surface 44 includes a second clip groove 48 that extends in a perpendicular relationship with respect to the second slot 46.

Figure 8:
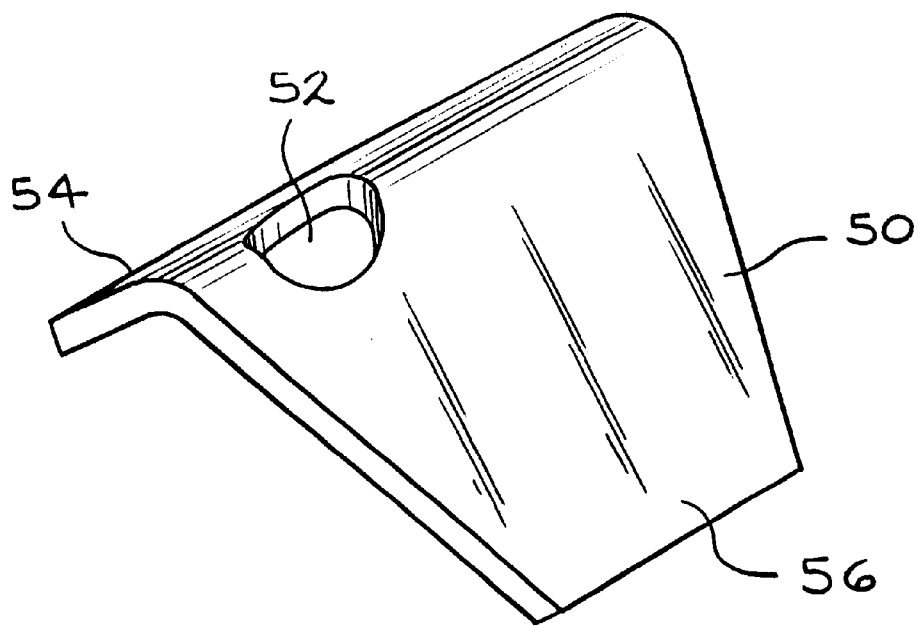
FIG. 8 is a perspective view of a clip according to the present invention.

As shown in FIG. 2, when the first and second members 30 and 32 are positioned to form the miter joint J, the first and second clip grooves 38 and 48 intersect at a point I. A clip 50 having a clip opening 52, as shown in detail in FIG. 8, is positioned in the first and second clip grooves 38 and 48 at the point I. The clip 50 includes a first wing 54 and a second wing 56 that are adapted to be received by the first and second clip grooves 38 and 48, respectively. In a preferred embodiment, the clip 50 is made of metal such as steel.

The intended use of the bracket assembly 10 is shown in FIGS. 1–3 and 7. When the first and second members 30 and 32 are positioned in the miter joint J, the bracket 12 is positioned so that the first surface 14 is positioned against the first interior surface 34 of the first member 30 and the second surface 16 is positioned against the second interior surface 44 of the second member 32. As shown in detail in FIG. 7, for example, the first attachment device 18 of the bracket 12 is received by the first slot 36 of the first member 30. In a similar manner, the second attachment device 20 is received by the second slot 46 of the second member 32. The clip 50 is positioned in the first and second clip grooves 38 and 48. As shown in FIG. 3, a threaded metal connector 60 extends through the clip opening 52 of the clip 50 and the first opening 22 of the bracket 12. A threaded metal fastener 62 extends through the second opening 24 of the bracket 12 to connect the bracket to the furniture article F. The bracket assembly 10 maintains the miter joint J between the first and second members 30 and 32.

The present invention is intended to be used, for example, in conjunction with crown molding members for furniture. However, it will be appreciated that the present invention can be used in a variety of applications for miter joints.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A bracket assembly for maintaining a miter joint comprising:

a bracket having a first surface and a second surface positioned at a predetermined angle with respect to said first surface;

first and second attachment devices longitudinally extending on said first and second surfaces of said bracket, respectively, each of said first and second attachment devices having geometric configurations; and first and second members having first and second interior surfaces, respectively, said first and second interior surfaces including first and second slots, respectively, said first and second slots having configurations corresponding to said geometric configurations of said first and second attachment devices, respectively, said first and second slots receiving said first and second attachment devices, respectively, to attach said bracket to said first and second members, said first and second interior surfaces further including first and second clip grooves, respectively, extending in substantially perpendicular relationship with respect to said first and second slots, said first and second clip grooves intersecting at a point, a clip including a clip opening being positioned in said first and second clip grooves at said point, said bracket including a bracket opening, connector means extending through said clip opening and said bracket opening to connect said clip to said bracket.

2. The bracket assembly of claim 1 wherein said predetermined angle is in a range from about 200° to about 280°.

3. The bracket assembly of claims 2, wherein said predetermined angle is substantially 240°.

4. The bracket assembly of claim 1, wherein each of said first and second attachment devices has a T-shaped configuration.

* * * * *